(12) United States Patent
Harrison (10) Patent No.: US 11,188,838 B2
(45) Date of Patent: Nov. 30, 2021

(54) DYNAMIC ACCESS OF ARTIFICIAL INTELLIGENCE ENGINE IN A CLOUD COMPUTING ARCHITECTURE

(71) Applicant: salesforce.com, inc., San Francisco, CA (US)

(72) Inventor: Daniel Thomas Harrison, Newmarket (CA)

(73) Assignee: salesforce.com, inc., San Francisco, CA (US)

(*) Notice: Subject to any disclaimer, the term of this patent is extended or adjusted under 35 U.S.C. 154(b) by 954 days.

(21) Appl. No.: 15/883,095

(22) Filed: Jan. 30, 2018

(65) Prior Publication Data

US 2019/0236466 A1   Aug. 1, 2019

(51) Int. Cl.
| | | |
|---|---|---|
| *G06N 5/04* | (2006.01) | |
| *G06F 16/27* | (2019.01) | |
| *G06Q 30/02* | (2012.01) | |
| *G06Q 50/00* | (2012.01) | |

(52) U.S. Cl.
CPC .............. *G06N 5/043* (2013.01); *G06F 16/27* (2019.01); *G06Q 30/0202* (2013.01); *G06Q 30/0251* (2013.01); *G06Q 30/0277* (2013.01); *G06Q 50/01* (2013.01)

(58) Field of Classification Search
CPC .... G06N 5/043; G06F 16/27; G06Q 30/0202; G06Q 30/0251; G06Q 30/0277; G06Q 50/01
See application file for complete search history.

(56) References Cited

U.S. PATENT DOCUMENTS

| | | | |
|---|---|---|---|
| 7,730,478 B2 | 6/2010 | Weissman | |
| 10,084,796 B2 | 9/2018 | Harrison | |
| 2017/0213155 A1* | 7/2017 | Hammond | ............ G06Q 10/00 |
| 2017/0308800 A1* | 10/2017 | Cichon | ................... G06T 1/20 |
| 2018/0322419 A1* | 11/2018 | Bugenhagen | .......... G06N 5/043 |
| 2019/0087529 A1* | 3/2019 | Steingrimsson | ..... G06N 3/0454 |
| 2019/0236297 A1 | 8/2019 | Efendiyev, Jr. et al. | |
| 2019/0236466 A1 | 8/2019 | Harrison | |

* cited by examiner

*Primary Examiner* — Paulinho E Smith
(74) *Attorney, Agent, or Firm* — Nicholson, De Vos, Webster & Elliott, LLP (57) ABSTRACT

A method and a cloud-computing architecture for enabling dynamic access of an artificial intelligence engine are described. A record that includes a set of one or more fields is stored in a database. A first field from the set of fields includes an identification of an artificial intelligence (AI) engine and one or more additional fields from the set of fields respectively include one or more parameters for the AI engine. The record is accesses causing the AI engine to run with the one or more parameters. As a result of the AI engine running with the one or more parameters upon access of the record, a desired predicted output is obtained.

18 Claims, 9 Drawing Sheets

| Records | Field 210A (e.g., record_ID) | Field 210B (e.g., install_date) | Field 210C (AI Engine ID) | Field 210D (AI Authentication credentials) | Field 210E (a type of desired predicted output) | Field 210F (image of product) | ... | Field 210N (e.g., Last Service ServiceDate) |
|---|---|---|---|---|---|---|---|---|
| Record 221 | Product_ID_221 | InstallDate_221 | AI_engine1 (e.g., (e.g., Uri for Analytics AI engine) | Authentication credentials_221 | Type of output_221 (e.g., Probability of failure in the next year) | | ... | ServiceDate_221 |
| Record 222 | Product_ID_222 | InstallDate_222 | AI_engine1 (e.g., (e.g., Uri for Analytics AI engine) | Authentication credentials_222 | Type of output_222 (e.g., Probability of failure in the next month) | | ... | ServiceDate_222 |
| Record 223 | Product_ID_223 | Record_Info_223 | AI_engine1 (e.g., (e.g., Uri for Analytics AI engine) | Authentication credentials_223 | Type of output_223 (e.g., probability of failure in the next month) | | ... | ServiceDate_223 |
| Record 224 | Product_ID_224 | InstallDate_224 | AI_engine2 (e.g., (e.g., Uri for Vision AI engine) | Authentication credentials_224 | Type of output_224 (e.g., probability that failure occurred) | Image_224 | ... | ServiceDate_224 |

Fig. 2B

STORE, IN A SYSTEM DATA STORAGE, A RECORD THAT INCLUDES A SET OF ONE OR MORE FIELDS, WHERE A FIRST FIELD FROM THE SET OF FIELDS INCLUDES AN IDENTIFICATION OF AN ARTIFICIAL INTELLIGENCE (AI) ENGINE AND ONE OR MORE ADDITIONAL FIELDS FROM THE SET OF FIELDS RESPECTIVELY INCLUDE ONE OR MORE PARAMETERS FOR THE AI ENGINE
310

A SECOND FIELD FROM THE SET OF FIELDS INCLUDES AUTHENTICATION CREDENTIALS FOR AUTHORIZING THE ACCESS TO THE AI ENGINE WHEN THE AI ENGINE IS RUN WITH THE ONE OR MORE PARAMETERS
312

A THIRD FIELD FROM THE SET OF FIELDS INCLUDES A TYPE OF THE DESIRED PREDICTED OUTPUT
314

ACCESS THE RECORD, WHICH CAUSES THE AI ENGINE TO RUN WITH THE ONE OR MORE PARAMETERS
320

REQUEST TO VIEW THE RECORD ON A GRAPHICAL USER INTERFACE PRESENTED TO A USER OF THE CLOUD COMPUTING INFRASTRUCTURE
322

REQUEST TO MODIFY THE RECORD
324

DYNAMICALLY OBTAIN, AS A RESULT OF THE AI ENGINE RUNNING WITH THE ONE OR MORE PARAMETERS UPON ACCESS OF THE FIRST FIELD OF THE RECORD, A DESIRED PREDICTED OUTPUT
330

DYNAMIC ACCESS OF ARTIFICIAL INTELLIGENCE ENGINE IN A CLOUD COMPUTING ARCHITECTURE

TECHNICAL FIELD

One or more implementations relate to the field of cloud computing architecture; and more specifically, to the dynamic access of artificial intelligence engine in a cloud computing architecture.

BACKGROUND ART

A multi-tenant cloud computing architecture supports one or multiple services that are made available to users of the cloud computing architecture. The service(s) may be on-demand services that are made available to the users working for one or more other organizations (sometimes referred to as outside users) so that those organizations do not need to necessarily be concerned with building and/or maintaining a system, but instead makes use of the service(s) when needed (e.g., on the demand of the users). The service(s) may communicate with each other and/or with one or more of the user electronic devices via one or more Application Programming Interface(s) (APIs) (e.g., a Representational State Transfer (REST) API).

In one implementation, the service(s) use data stored within a database. The database may comprise one or more database objects that are managed by a Database Management System (DBMS), each database object may include a number of records, and each record may comprise of a set of fields.

In some implementations, the cloud computing architecture may have access to an artificial intelligence (AI) engine (e.g., Einstein by salesforce.com, Inc.) that can be used to provide analytics service(s) (such as AI-driven answers, explanations, sentiment, and recommendations/predictions) to one or more service(s) of the cloud computing architecture. In some implementations, the AI engine is coupled with the database managed by the DBMS and may use the data stored in the database. Current techniques used to integrate the AI engine with the services(s) of the cloud computing architecture (e.g., receiving data from the AI engine) require a complex process that entails the execution of multiple steps and calls (e.g., API calls) to the service(s) and/or the AI engine. In these prior art techniques, the integration of the AI engine with the service(s) of the cloud computing architecture require development experience to implement the API calls and the management and implementation can be complex and time consuming for the users of the cloud computing architecture.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for dynamically accessing an AI engine in a cloud computing architecture. The implementations described below enable users of a cloud-computing infrastructure to dynamically interact with an artificial intelligence (AI) engine and obtain desired predicted outputs. In one implementation, a cloud computing architecture is operative to store, in a system data storage, a record that includes a set of one or more fields. The set of fields includes a first field that includes an identification of the AI engine and one or more additional fields that respectively include one or more parameters for the AI engine. The record is accessed causing the AI engine to run with the one or more parameters, and enabling to dynamically obtain, as a result of the AI engine running with the one or more parameters upon access of the record, a desired predicted output.

Thus, the implementations described herein enable the dynamic access of the AI engine without the need to store results and run multiple predictions for a given record. In some implementations, the predicted output is viewed as data from a data source that is external to the system data storage. Contrary to the prior art approaches for the integration of AI engine in cloud computing infrastructure, in the present implementation, the response of the AI engine (e.g., the predicted output) is invoked an external data source without the need for API calls. This provides a declarative solution that enables users to dynamically interact with AI engines without the need to store results or run multiple predictions. The present implementations enable the evaluation of a predicted output when the record is accessed, removing the need for separate API calls or operations for evaluating the predicted output.

Figure 1A:
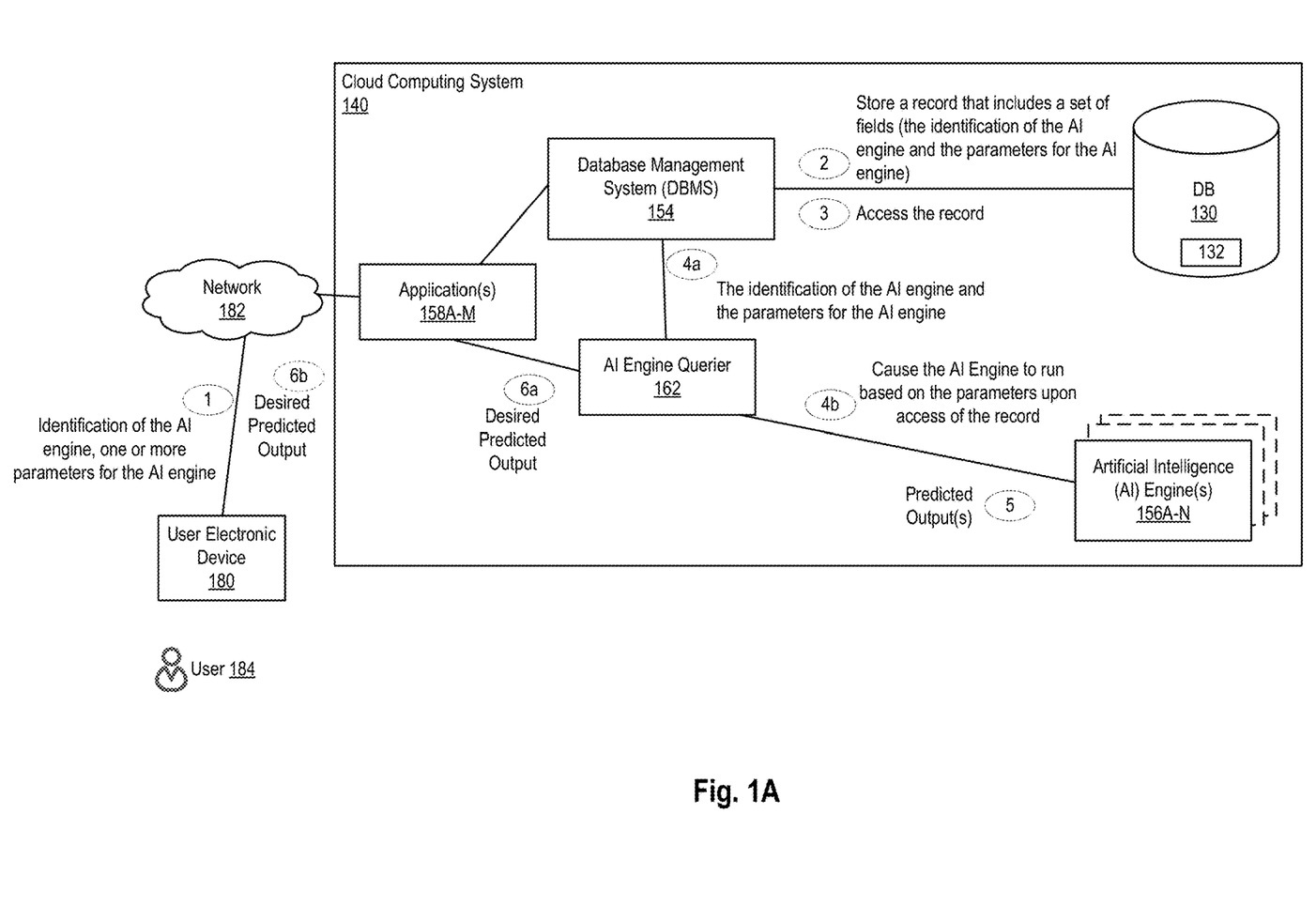
FIG. 1A is a block diagram illustrating cloud computing architecture for a dynamic access of artificial intelligence engine, according to some example implementations.

FIG. 1A is a block diagram illustrating a cloud computing architecture for enabling a dynamic access of artificial intelligence engine, according to some example implementations. A cloud computing system 140 is a cloud computing architecture that includes a database management system (DBMS) 154, a database 130, one or more applications 158A-M, and one or more artificial intelligence engine(s) 156A-N. The system 140 is coupled to a user electronic device 180 over a network 182. The DBMS 154, the database 130, the application(s) 158A-M, the AI engine querier 162, and the AI engine(s) 156A-N may be part of an on-demand service that is made available to one or more of the users (e.g., user 184) working for one or more other organizations (sometimes referred to as outside users) so that those organizations do not need to necessarily be concerned with building and/or maintaining a system, but instead makes use of the DBMS 154, the database 130, one or more of the application(s) 158A-M, the AI engine querier 162, and the AI engine(s) 156A-N when needed (e.g., on the demand of the users 184). The user electronic device 180 is operated by the user 184. In one implementation, the cloud computing system 140 is implemented as described in further details with reference to FIG. 4B, where the cloud computing system 440 is an exemplary implementation of the cloud computing system 140.

The system 140 includes database 130 for storing data 132. The data can be tenant-level data and/or system-level data. In some implementations, the system 140 may include more than one database, each database used to store a different type of data. In one implementation, the system 140 is a multi-tenant cloud computing architecture supporting multiple services offered to users of the system. In certain implementations, the system 140 includes a set of one or more servers that are running on server electronic devices and that are configured to handle requests for any authorized user associated with any tenant (there is no server affinity for a user and/or tenant to a specific server). The user electronic device 180 communicates with the server(s) of system 140 to request and update tenant-level data and system-level data hosted by system 140, and in response the system 140 (e.g., one or more servers in system 140) automatically may generate one or more Structured Query Language (SQL) statements (e.g., one or more SQL queries) that are designed to access the desired information from the database 130.

The system 140 includes one or more artificial intelligence (AI) engines 156A-N. Each one of the AI engines 156A-N is a layer of artificial intelligence that delivers predictions and recommendations based on the unique processes and customer data of an organization using the cloud computing system. For example, the AI engines 156A-N leverage the data 132 stored in the database 130 to obtain a desired predicted output. The predicted output provides insights on the data 132, enabling the organizations using the system 140 to automate responses and actions, to increase employee productivity, to predict product failures, and to increase customer satisfaction, etc. Each of the AI engines 156A-N automatically and continuously analyzes the data (e.g., data 132). In some implementations, the data is analyzed based on one or more predictive models such as Logistic Regression, Random Forests, and Naive Bayes. Other models can be used without departing from the scope of the present implementations.

In one implementation, the AI engines 156A-N include at least one of a sales AI engine, a marketing AI engine, a community AI engine, an analytics AI engine, a language AI engine, a sentiment analysis engine, and a vision AI engine. For example, the sales AI engine is operative to analyze and obtain insight on sales related data (such as leads, opportunities, contracts, contacts, etc.). The sales AI engine may automatically analyze, based on historical sales data and discover the top factors that determine whether a lead is likely to convert to an opportunity. In a second example, the marketing AI engine is operative to enable advertisement targeting. In a third example, the community AI engine is operative to analyze and obtain insight on user activity in a community platform (e.g., a chat platform, a social-network platform, etc.). For example, the community AI engine enables community members to discover people, content, and conversations they need to be the most productive, every day. In a fourth example, the analytics AI engine enables users of the cloud computing infrastructure to find patterns in data to predict future trends, the next best sales, service, or marketing action. In a fifth example, the language AI engine can be used to identify the topic or intent or style of a message that is received to improve routing or assignment, such as gauging the level of expertise in a particular topic to match to a suitable person to respond or in outbound messages to make sure it is suitable for the intended recipient. In a sixth example, any free form text can be used to get feedback from the AI engine for the tone or classification of the sentiment to prioritize or deal with specific language considerations. In a seventh example, the vision AI engine enables users of the cloud computing architecture to use image recognition in applications by training deep-learning models to recognize brands, products, failure of products and more.

Network 182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 140 and the user electronic device 180.

The user electronic device 180 (such as a desktop personal computer, workstation, laptop, Personal Digital Assistant (PDA), smart phone, augmented reality (AR) device, virtual reality (VR) device, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications (e.g., application 158A-M) and other information provided by system 140. For example, the user interface device can be used to access data and applications hosted by system 140, and to perform searches on stored data, and otherwise allow a user 184 to interact with various GUI pages that may be presented to a user 184. The user electronic device 180 might communicate with system 140 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, the user electronic device 180 might include an HTTP client, commonly referred to as a "browser," for sending and receiving HTTP messages to and from server(s) of system 140, thus allowing the user 184 of the user electronic device 180 to access, process and view information, pages and applications available to it from system 140 over network 182.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multitenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

The system 140 includes an AI engine querier 162 that enables dynamic access of an AI engine. The AI engine querier 162 may be part of an application platform (not illustrated) that enables Platform as A Service (PAAS) for creating, managing, and executing one or more applications (e.g., applications 146A-M) developed by the provider of the application platform, users accessing the system 140 via one or more of user electronic devices, or third-party application developers accessing the system 140 via one or more of user electronic devices. In some implementation the AI engine querier is implemented separately from the DBMS 154. Alternatively, the AI engine querier 162 can be part of the DBMS 154.

At operation 1, the system 140 receives from the user electronic device 180 an identification of an AI engine and one or more parameters for the AI engine. The identification of the AI engine is an identifier that uniquely identifies the AI engine within the network. For example, the identifier can be a Uniform Resource Locator (URL) that specifies a location of the AI engine in the network. In another implementation, the identification of the AI engine can be unique global identifier set by an administrator of the cloud computing system 140. The parameters can be any number of parameters that can be used by the AI engine to obtain insight for a given record. The identifier of the AI engine and the one or more parameters are obtained as fields of a record when the record is created or when the record is updated by the user 184.

Figure 2A:
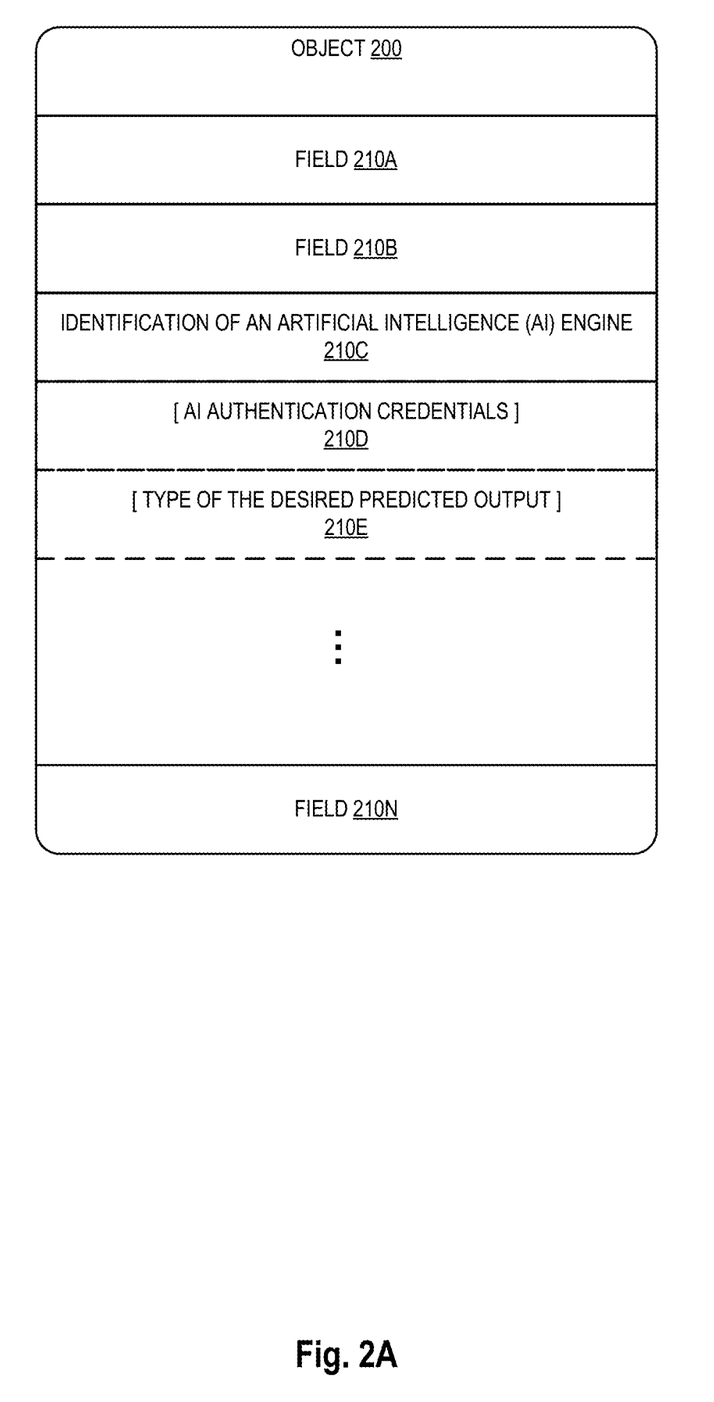
FIG. 2A is a block diagram illustrating an exemplary object defined in the database, according to some example implementations.

FIG. 2A is a block diagram illustrating an exemplary database object defined in the database 130, according to some example implementations. The database object 200 can have a structure defined by the DBMS (a standard database object) and/or defined by a user (custom database object). In some implementations of a cloud database (a database that runs on a cloud platform and that is provided as a database service), identifiers are used instead of database keys, and relationships are used instead of foreign keys. The database object 200 includes a set of one or more fields 210A-N and defines an exemplary structure of records that can be stored in the database 130. The set of fields 210A-N includes field 210C and optional fields 210D and 210E. The field 210C includes an identification of an AI engine. The field 210D includes AI authentication credentials (e.g., username and password). The field 210E includes a type of a desired predicted output that is to be obtained from the AI engine. The set of fields 210A-N can also include one or more additional fields (e.g., 210A, 210B, 210N). In some implementations, at least one of these additional fields can be used when the AI engine is invoked upon access of a record, as it will be discussed in further details below.

Figure 2B:
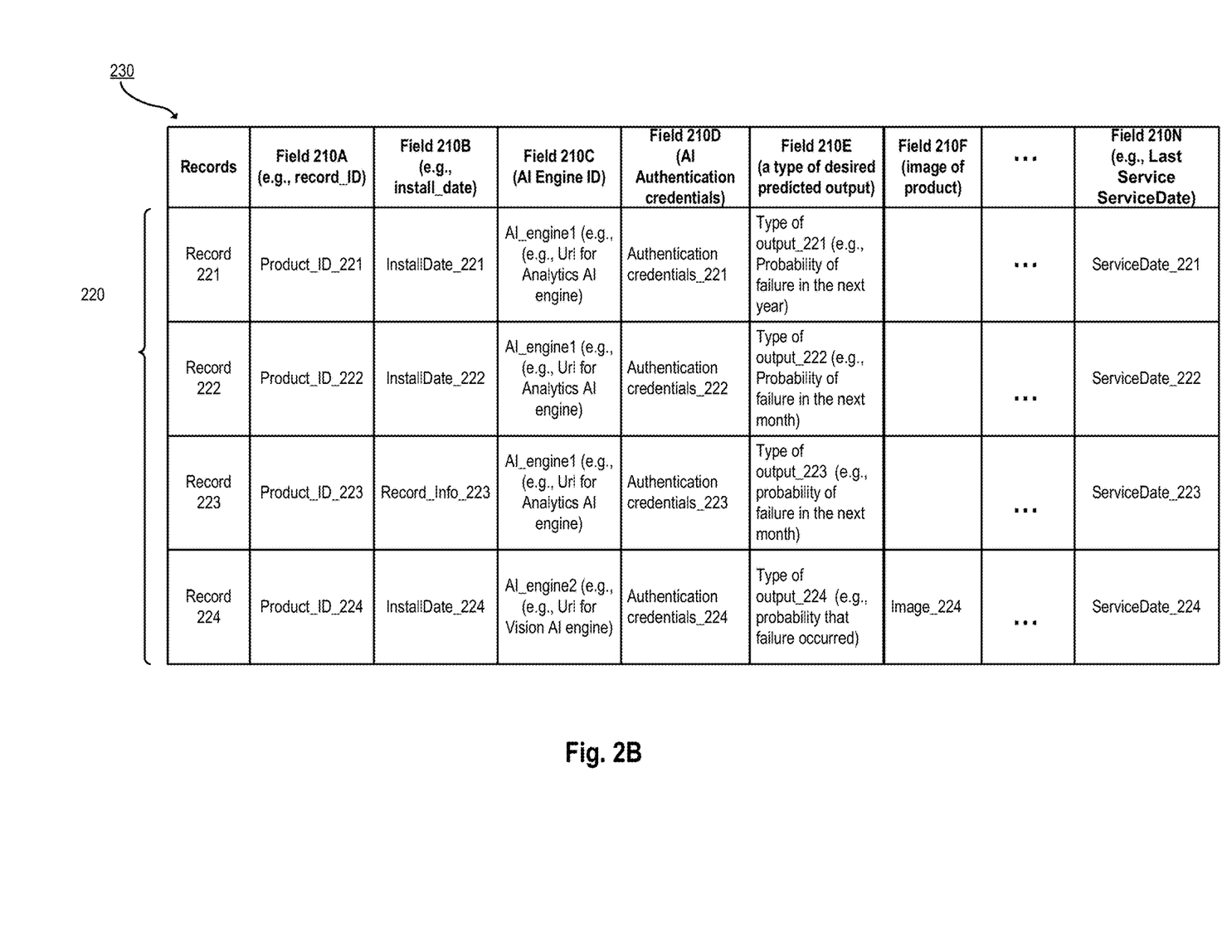
FIG. 2B is a block diagram illustrating a set of exemplary records in the database, according to some example implementations.

FIG. 2B is a block diagram illustrating a set of exemplary records 220 in the database, according to some example implementations. While implementations may use one or more types of databases, a relational database with tables will be described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record (e.g., each one of the records 221, 222, 223, 224) are defined by the structure of the database object (e.g., database object 200) to which it belongs. By way of example, the database may include a table 230 that describes a machine with fields for information about the machine (e.g., a product ID, a date of installation of the product (InstallDate), and a date for the last time the product was serviced (ServiceDate), etc.). Other examples of tables and records can be used without departing from the scope of the present implementation. In another example (not illustrated), the table may include a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

In the illustrated example, each one of the records 221-224 has a set of fields. Each one of the set of fields includes a field 210C that includes an identification of an AI engine that is to be used for obtaining a predicted output for the record. For example, the record 221 includes in field 210C AI_engine1 as the identification of the AI engine. The identification can be an URL indicating the location of an analytics AI engine. In another example, the record 224 includes in field 210C AI_engine2 as the identification of the AI engine. In this example, the identification can be an URL indicating the location of a vision AI engine. While in these exemplary implementations, the AI engine is identified based on a URL in other implementation other types of unique identifiers can be used. In addition to the field 210C, in some implementations, each record may include an optional field 210D or the optional field 210E. The field 210D includes authentication credentials (e.g., a username and a password of the user accessing the record) that can be used to confirm/authorize access to the AI engine. For example, with reference to product 223, authentication credentials 223 are used to authorize access to AI_engine1 when the record 223 is accessed.

Returning to FIG. 1A, the user may enter the identification of the AI engine and the parameters (e.g., product_ID, InstallDate, authentication credentials, predicted output type, ServiceDate, etc.) when the record is created or when the record is updated/modified. The user may use a graphical user interface (GUI) displayed on the user electronic device 180 to enter the identification of the AI engine as well as the parameters. While in some implementations, the AI engine identification and the parameters can be entered by the user simultaneously (e.g., when the record is first created), in other implementations, the AI engine identification can be entered separately (i.e., at a different time) than at least one other parameters. In some implementations, the parameters can be one or more fields of the record that are different from the identification of the AI engine. With reference to FIG. 2B, in one example, when the AI engine is a vision AI engine, as it is the case for record "product 224," the parameters include the field 210F which is an image of the product 224. In another example, when the AI engine is an analytics engine, as it is the case for record "product 223," the parameters can include the fields 210A (record_ID), 210B (InstallDate), and 210N (ServiceDate). Thus, the fields used as parameters for the AI engine may depend on the type of AI engine that is to be run.

Once the identification of the AI engine and the parameters for the AI engine are received, the DBMS 154 stores, at operation 2, in the database 130, a record that includes a set of one or more fields. A first field from the set of fields (e.g., field 210C) includes the identification of the AI engine and one or more additional fields from the set of fields that respectively include the one or more parameters for the AI engine (e.g., fields 210A, 210B, 210D, etc.). At operation 3, the record is accessed by the DBMS 154, which causes (operation 4a and 4b) the AI engine to run with the one or more parameters. The AI engine querier 162 requests from the AI engine (e.g., AI engine 156A) identified based on the identification of the AI engine received from the DBMS at access of the record, to run based on the set of parameters defined in the fields of the record. At operation 5, the AI engine returns a desired predicted output. The DMBS dynamically obtains, as a result of the AI engine running with the one or more parameters upon access of the record, the desired predicted output. In some implementations, the desired predicted output is returned to the user electronic device 180 to be displayed to the user (operation 6b). Alternatively or additionally, the desired predicted output can be further processed by one or more application(s) 158A-M (operation 6a).

Figure 1B:
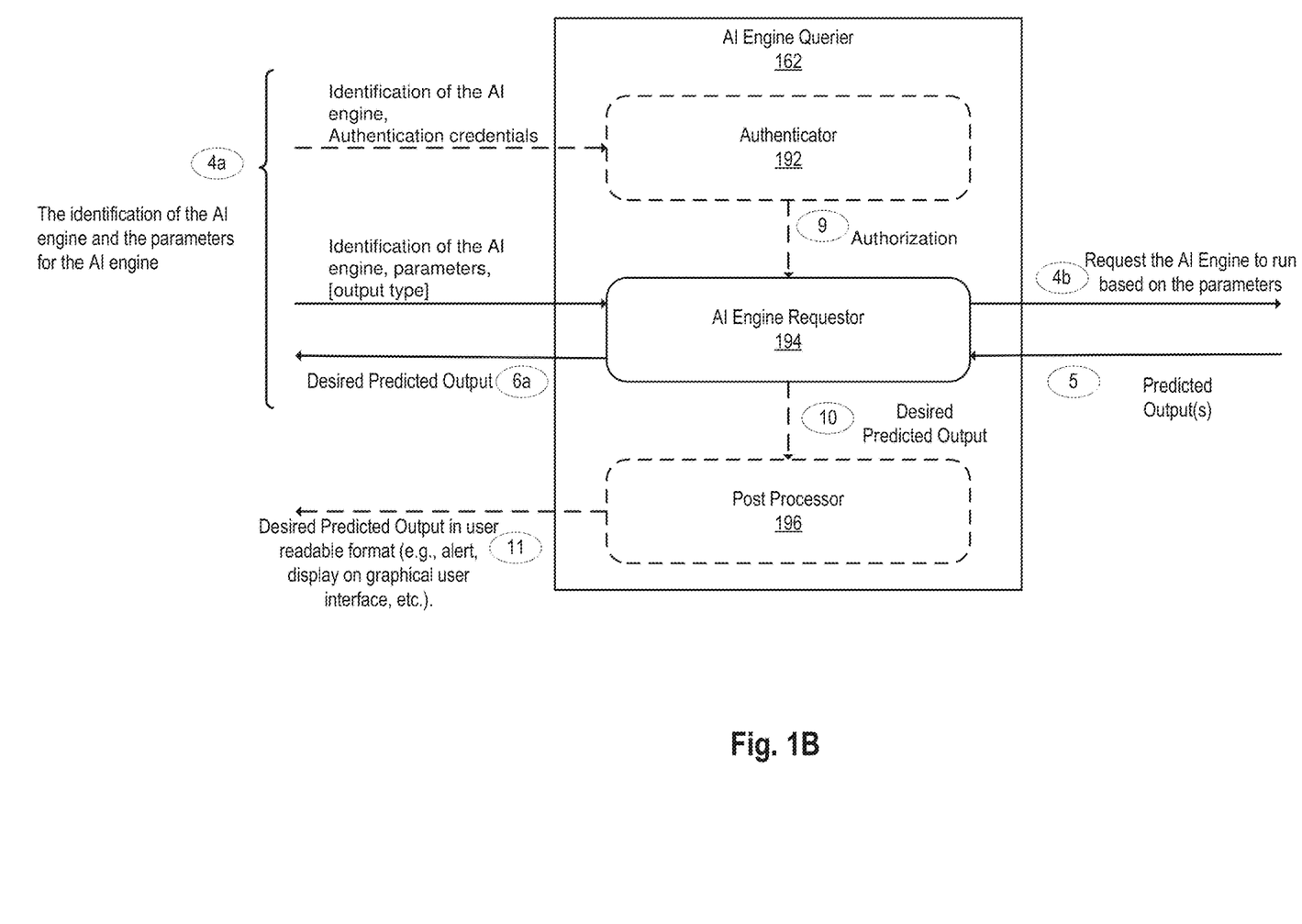
FIG. 1B is a more detailed block diagram illustrating an exemplary AI engine querier, according to some example implementations.

FIG. 1B is a more detailed block diagram illustrating an exemplary AI engine querier, according to some example implementations. When the record is accessed by the DBMS 154, this causes the AI engine to run with the one or more parameters as identified in one or more fields of the record. In some implementations, accessing the record includes requesting to view the record on a graphical user interface presented to a user of the cloud computing architecture. Additionally or alternatively, in some implementations, accessing the record includes requesting to modify the record in the database 130. The AI engine querier 162 is operative to cause the AI engine to run based on the parameters. The AI engine querier receives the identification of the AI engine and the parameters for the AI engine (operation 4a). The AI engine querier identifies the AI engine as identified by the identification and generates a request (operation 4b) to the AI engine to run based on the received parameters. In some implementations, prior to the request being transmitted to the AI engine (e.g., by the AI engine requestor 194), the authenticator 192 of the AI engine querier 162 may determine whether the user 184 is authorized to access the AI engine based on the authentication credentials received. The authentication credentials can be a username uniquely identifying the user or a combination of a username and a password. When the authenticator confirms that the access to the AI engine is authorized an authorization (9) is sent to the AI engine requestor. In some implementations, the AI engine requestor 194 defines the result to be obtained from the AI engine as data from a data source that is external to the database 130 (i.e., external data source).

As a result of the AI engine running with the one or more parameters upon access of the record, a desired predicted output is obtained (operation 5). The desired predicted output depends on the type of AI engine that is run and on the parameters that are input to the AI engine. In some implementations, the AI engine requestor 194 may receive several predicted output(s) from the AI engine and may select a single one of the predicted output(s) as the desired predicted output based on the type of output that was defined. The desired predicted output is then transmitted (operation 6a) towards an application or the user electronic device. In some implementations, the AI engine querier can include a post-processor 196. The post processor is operative to receive the desired predicted output (operation 10) and transform it into a user readable format (11). For example, the predicted output can be obtained as a data of an external data source and can be converted in the post processor 196 into an alert, a message, an email to be transmitted to the user or displayed on the user electronic device 184.

Figure 3A:
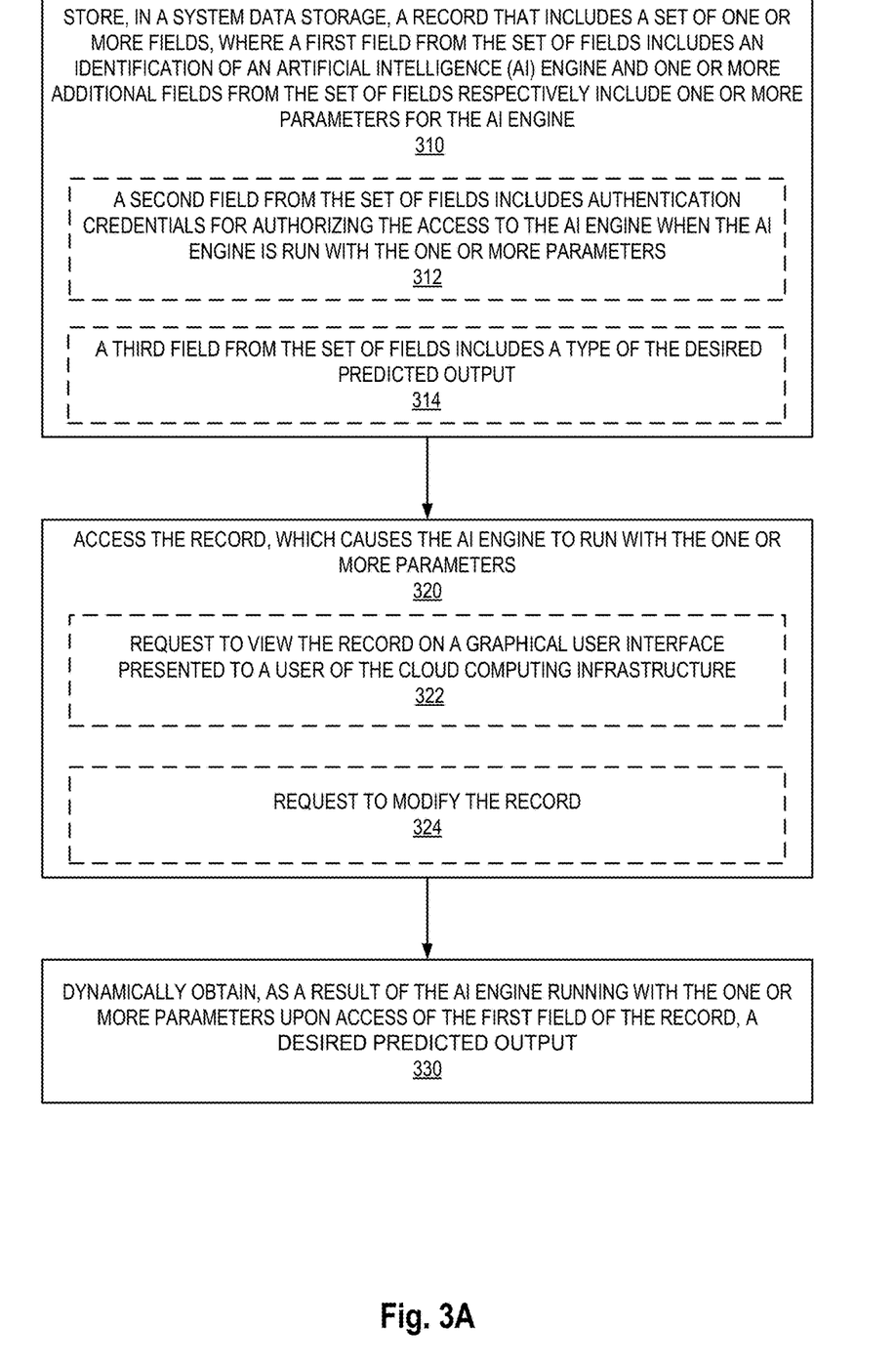
FIG. 3A is a flow diagram illustrating exemplary operations for dynamically accessing an AI engine, according to some example implementations.

FIG. 3A is a flow diagram illustrating exemplary operations for dynamically accessing an AI engine, according to some example implementations. While in some implementations, the operations of FIG. 3A are performed in a cloud-computing system (e.g., cloud computing system 140), in alternative implementations, the operations can be performed in a more conventional computing environment other than a cloud computing architecture. In some implementation, the operations are performed by a DBMS (e.g., DBMS 154) and an AI engine querier 162. At operation 310, a record that includes a set of one or more fields is stored in a system data storage. For example, the record is stored in system data storage 132 that is managed by the database management system 130. A first field from the set of fields of the record includes an identification of an AI engine and one or more additional fields from the set of fields respectively include one or more parameters for the AI engine. In some implementations, a second field (operation 312) from the set of fields of the record includes authentication credentials for authorizing the access to the AI engine when the AI engine is run with the parameters. In some implementations, a third field (operation 314) from the set of fields of the record includes a type of the desired predicted output. For example, the AI engine may be operative to return several predicted outputs, and the third field of the record may indicate which ones of these outputs is desired.

Flow then moves to operation 320, at which the record is accessed. When the record is accessed, this causes the AI engine to run with the one or more parameters as identified in one or more fields of the record. In some implementations, accessing the record includes requesting (operation 322) to view the record on a graphical user interface presented to a user of the cloud computing architecture. Additionally or alternatively, in some implementations, accessing the record includes requesting (operation 324) to modify the record in the system data storage.

The flow of operations moves from operation 320 to operation 330, at which as a result of the AI engine running with the one or more parameters upon access of the record, a desired predicted output is obtained. The desired predicted output depends on the type of AI engine that is executed and on the parameters that are input to the AI engine.

Figure 3B:
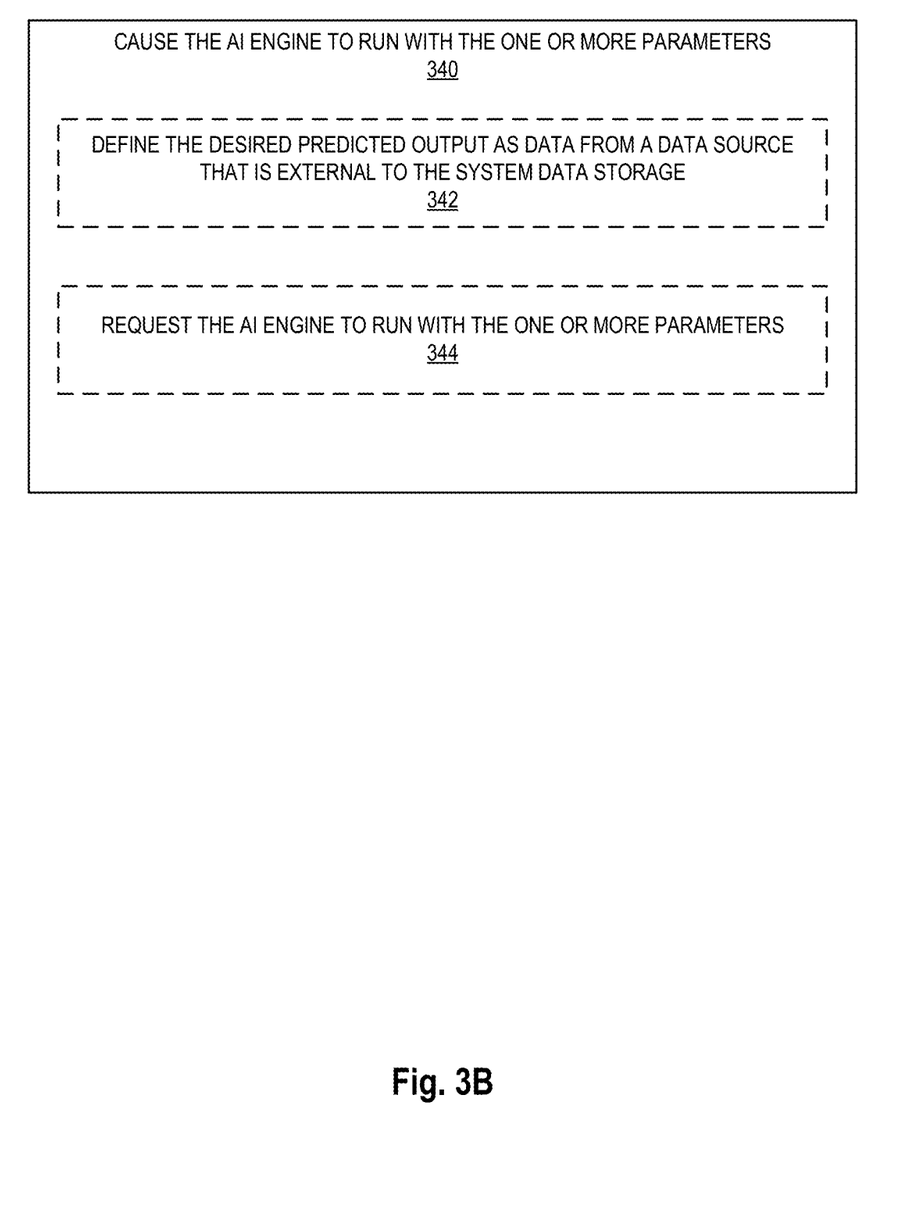
FIG. 3B is a flow diagram illustrating exemplary operations performed when the AI engine is caused to run with the one or more parameters according to some implementations.

FIG. 3B is a flow diagram illustrating exemplary operations performed when the AI engine is caused (operation 340) to run with the one or more parameters according to some implementations. At operation 342 the desired predicted output is defined as data from a data source that is external to the database 130 (i.e., external data source). The AI engine is then requested, at operation 344, to run with the parameters to obtain the desired predicted output. In some implementations the operations of FIG. 3B are performed by the AI engine requestor 194.

Figure 3C:
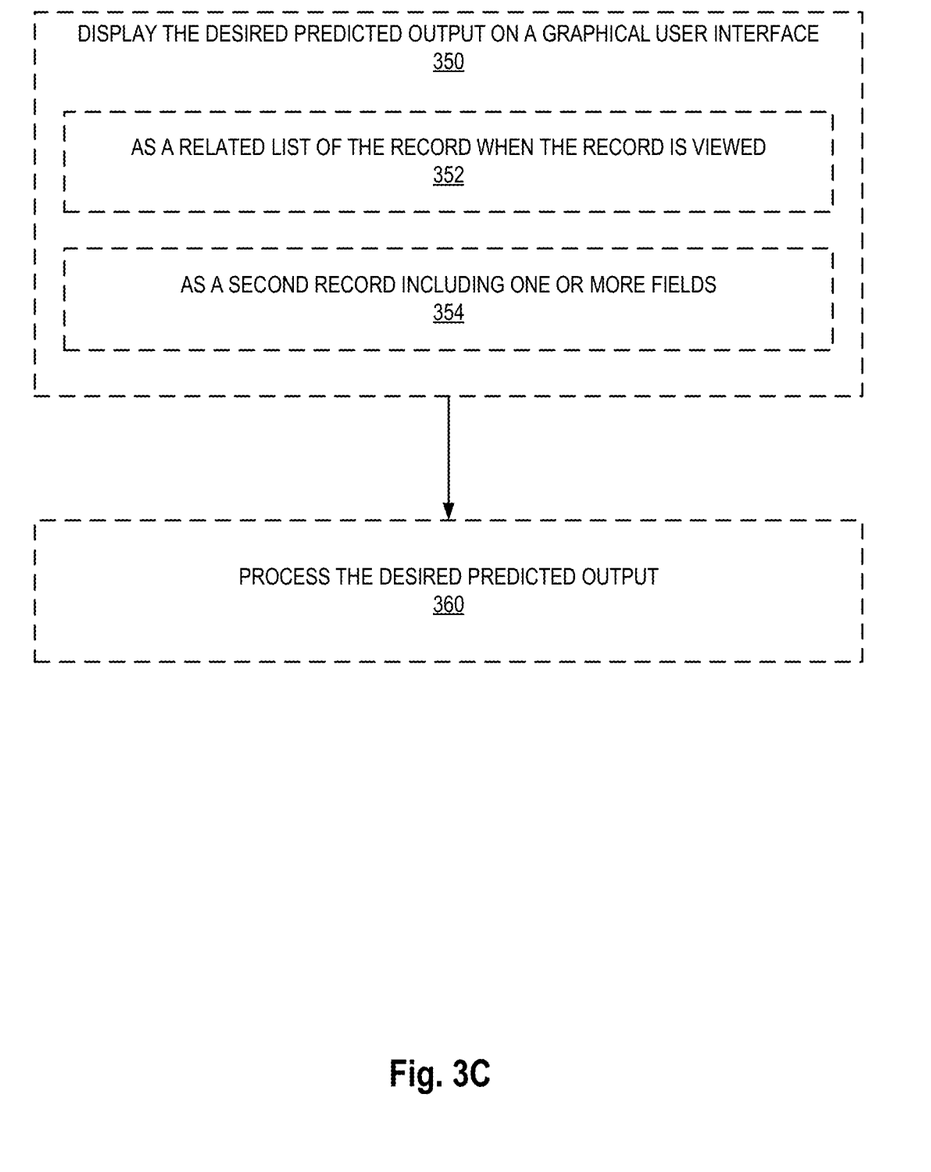
FIG. 3C is a flow diagram illustrating exemplary operations that may be performed when the predicted output is received from the AI engine, according to some implementations.

FIG. 3C is a flow diagram illustrating exemplary operations that may be performed when the predicted output is received from the AI engine, according to some implementations. At operation 350, the system 140 displays the desired predicted output on a graphical user interface. In one implementation, the desired predicted output can be displayed (operation 352) as a related list of the record when the record is viewed. Alternatively, the desired predicted output can be displayed (operation 354) as a second record including one or more fields.

Additionally or alternatively, the desired predicted output can be processed (operation 360) by one or more applications in communication with the DBMS 154. For example, the desired predicted output can be used to determine whether an alert (e.g., a text message, an email, a notification, etc.) is to be transmitted to a user of the system 140.

The implementations described herein provide a purely declarative solution that enables users of a cloud computing system to dynamically interact with AI engines and obtain predictions without the need to store results and run multiple predictions. In the mechanisms describes herein, data within an application is mapped to input parameters for the evaluation of an Artificial Intelligence model (by defining the parameters as fields of a record) and the predictive results are provided as an external object. This allows for the evaluation of a prediction when the record is accessed instead of making API calls as it was the case in the prior art approaches. In some implementation, in contrast to the prior art approaches, the result obtained from the AI engine is dynamically generated by the request to the AI engine and is not generated by a call to the database. The result of the call does not live in the database storing the data.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
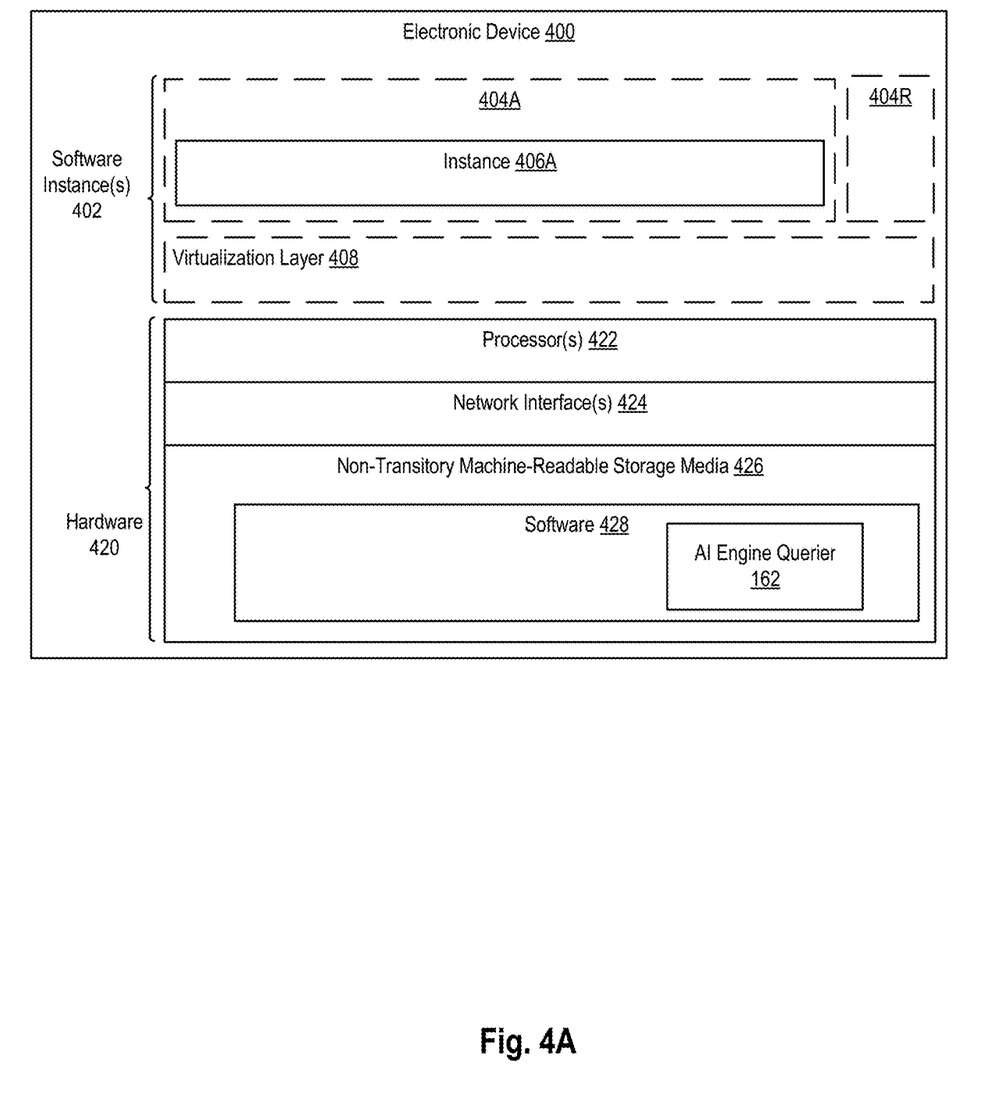
FIG. 4A is a block diagram illustrating an electronic device, according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Each of the previously described end user clients and the elements of the system 140 may be implemented in one or more electronic devices 400. In one implementation: 1) each of the end user clients is implemented in a separate one of the electronic devices 400 (e.g., in user electronic devices operated by users where the software 428 represents the software to implement end user clients to interface with the system 140 (e.g., a web browser, a native client, a portal, a command-line interface, and/or an application program interface (API) based upon protocols such as Simple Object Access Protocol (SOAP), Representational State Transfer (REST), etc.)); 2) the XYZ service is implemented in a separate set of one or more of the electronic devices 400 (e.g., a set of one or more server electronic devices where the software 428 represents the software to implement the system 140); and 3) in operation, the electronic devices implementing the end user clients and the system 140 would be communicatively coupled (e.g., by a network) and would establish between them (or through one or more other layers) connections for enabling a dynamic access of the AI engine and obtaining a predicted output. Other configurations of electronic devices may be used in other implementations (e.g., an implementation in which the end user client and the system 140 are implemented on a single electronic device 400).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Figure 4B:
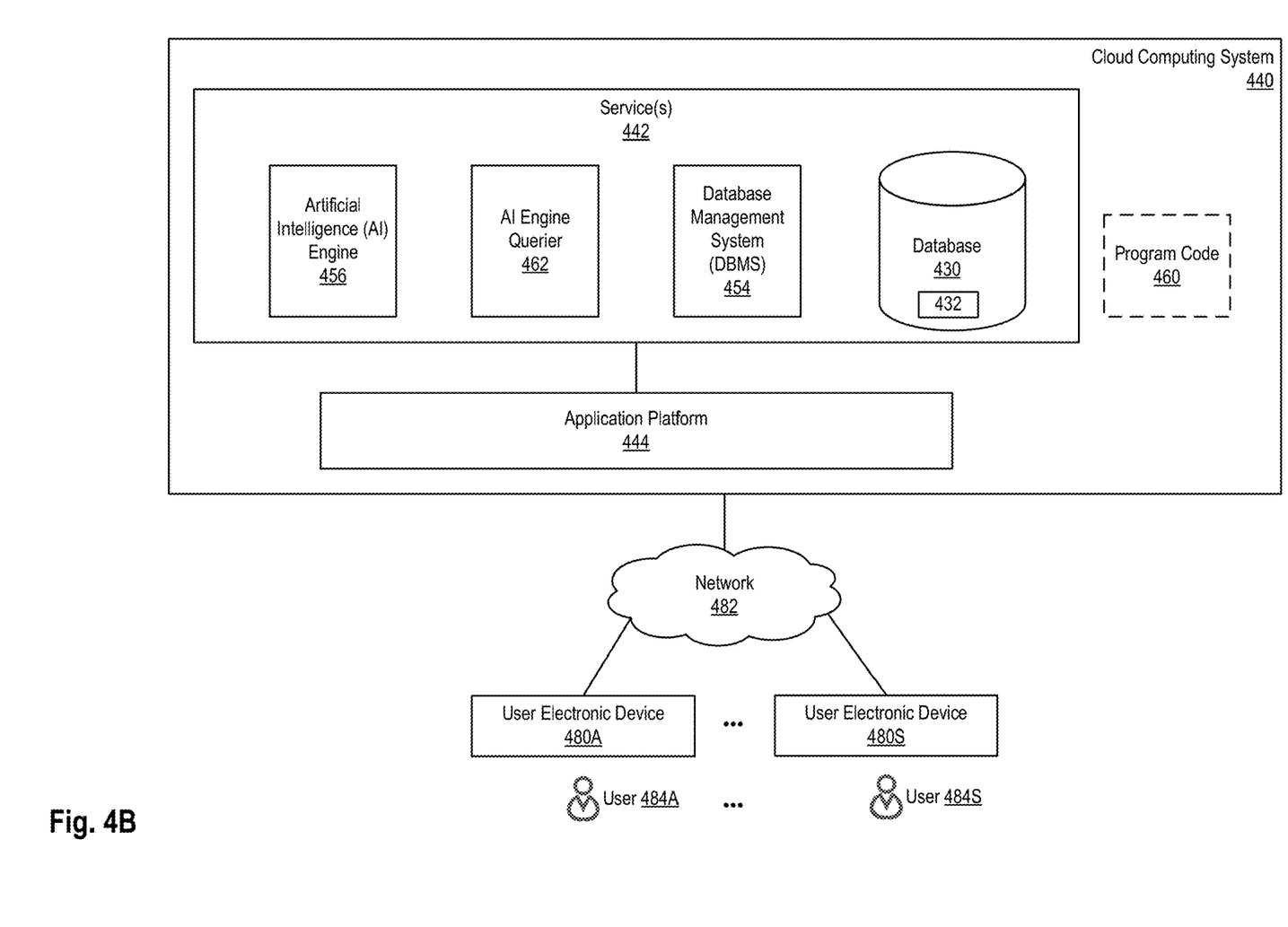
FIG. 4B is a block diagram of an environment where a dynamic access to an AI engine is enabled in a cloud computing architecture, according to some implementations.

FIG. 4B is a block diagram of an environment where a cloud computing infrastructure may be deployed, according to some implementations. In some implementations, the system 440 is an exemplary implementation of the system 140. A system 440 includes hardware (a set of one or more electronic devices) and software to provide one or more service(s). The system 440 is coupled to user electronic devices 480A-S over a network 482. The service(s) may be on-demand services that are made available to one or more of the users 484A-S working for one or more other organizations (sometimes referred to as outside users) so that those organizations do not need to necessarily be concerned with building and/or maintaining a system, but instead makes use of the service(s) when needed (e.g., on the demand of the users 484A-S). The service(s) may communicate with each other and/or with one or more of the user electronic devices 480A-S via one or more Application Programming Interface(s) (APIs) (e.g., a Representational State Transfer (REST) API). The user electronic devices 480A-S are operated by users 484A-S.

In one implementation, the system 440 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (456) (e.g., Einstein by salesforce.com, Inc.), and/or Infrastructure as a Service (IAAS) (e.g., virtual machines, servers, and/or storage). For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S. In one implementation the services may include an AI engine querier 462 that is operative to perform operations described with respect to FIGS. 1A-3B.

In some implementations, one or more of the service(s) may utilize one or more multi-tenant databases, as well as system data storage for system data accessible to system. The databases (e.g., database 430) may comprise one or more database objects that are managed by a Database Management System (DBMS) 454, each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In some implementations of a cloud database (a database that runs on the cloud computing architecture and that is provided as a database service), identifiers are used instead of database keys, and relationships are used instead of foreign keys. While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database and/or system data storage.

In some implementations, the service(s) are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 440 and the user electronic devices 480A-S.

Each user electronic device 480A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process and view information, pages and applications available to it from system 440 over network 482.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used.

"Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method in a cloud-computing architecture, the method comprising:
    storing, in a database, a record that includes a set of one or more fields, wherein a first field from the set of fields includes an identification of an artificial intelligence (AI) engine and one or more additional fields from the set of fields respectively include one or more parameters for the AI engine, wherein the identification of the AI engine and the one or more parameters are entered when the record is created or modified by a user;
    in response to a request to view or update the record, generating one or more query statements for accessing the record in the database, wherein the accessing the record causes the AI engine to run with the one or more parameters as inputs; and
    dynamically obtaining, as a result of the AI engine running with the one or more parameters as inputs, a desired predicted output.

2. The method of claim 1, wherein the dynamically obtaining the desired predicted output includes defining the desired predicted output as data from a data source that is external to the database.

3. The method of claim 1, wherein a second field from the set of fields includes authentication credentials for authorizing access to the AI engine when the AI engine is run with the one or more parameters as inputs.

4. The method of claim 1, wherein a third field from the set of fields includes a type of the desired predicted output.

5. The method of claim 1, wherein the request to view the record is a request for view the record on a graphical user interface presented to a user of the cloud computing architecture.

6. The method of claim 5 further comprising:
    displaying the desired predicted output on the graphical user interface as a related list of the record or as a second record.

7. The method of claim 1, further comprising:
    processing the desired predicted output.

8. The method of claim 1, wherein the identification of the AI engine is a Uniform Resource Locator (URL) that specifies a location of the AI engine in a network.

9. The method of claim 1, wherein the AI engine is included in the cloud-computing architecture and includes a sales AI engine, a marketing AI engine, a community AI engine, an analytics AI engine, a language AI engine, a sentiment analysis engine, or a vision AI engine.

10. A non-transitory machine-readable storage medium that provides instructions that, if executed by a processor in a cloud-computing architecture, will cause said processor to perform operations comprising:
    storing, in a database, a record that includes a set of one or more fields, wherein a first field from the set of fields includes an identification of an artificial intelligence (AI) engine and one or more additional fields from the set of fields respectively include one or more parameters for the AI engine, wherein the identification of the AI engine and the one or more parameters are entered when the record is created or modified by a user;
    in response to a request to view or update the record, generating one or more query statements for accessing the record in the database, wherein the accessing the record causes the AI engine to run with the one or more parameters as inputs; and
    dynamically obtaining, as a result of the AI engine running with the one or more parameters as inputs, a desired predicted output.

11. The non-transitory machine-readable storage medium of claim 10, wherein the dynamically obtaining the desired predicted output includes defining the desired predicted output as data from a data source that is external to the database.

12. The non-transitory machine-readable storage medium of claim 10, wherein a second field from the set of fields includes authentication credentials for authorizing access to the AI engine when the AI engine is run with the one or more parameters as inputs.

13. The non-transitory machine-readable storage medium of claim 10, wherein a third field from the set of fields includes a type of the desired predicted output.

14. The non-transitory machine-readable storage medium of claim 10, wherein the request to view the record is a request to view the record on a graphical user interface presented to a user of the cloud computing architecture.

15. The non-transitory machine-readable storage medium of claim 14, wherein the operations further comprise:
    displaying the desired predicted output on the graphical user interface as a related list of the record or as a second record.

16. The non-transitory machine-readable storage medium of claim 10, wherein the operations further comprise:
    processing the desired predicted output.

17. The non-transitory machine-readable storage medium of claim 10, wherein the identification of the AI engine is a Uniform Resource Locator (URL) that specifies a location of the AI engine in a network.

18. The non-transitory machine-readable storage medium of claim 10, wherein the AI engine is included in the cloud-computing architecture and includes a sales AI engine, a marketing AI engine, a community AI engine, an analytics AI engine, a language AI engine, a sentiment analysis engine, or a vision AI engine.

* * * * *